United States Patent
Petersen et al.

(10) Patent No.: US 11,906,782 B2
(45) Date of Patent: Feb. 20, 2024

(54) TERMINATING A CABLE ASSEMBLY WITH CONNECTORIZED PIGTAILS

(71) Applicant: CommScope Technologies LLC, Hickory, NC (US)

(72) Inventors: Cyle D. Petersen, Belle Plaine, MN (US); Thomas Marcouiller, Shakopee, MN (US); John Paul Anderson, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 189 days.

(21) Appl. No.: 17/217,470

(22) Filed: Mar. 30, 2021

(65) Prior Publication Data

US 2021/0302657 A1   Sep. 30, 2021

Related U.S. Application Data (60) Provisional application No. 63/002,402, filed on Mar. 31, 2020.

(51) Int. Cl.
G02B 6/25 (2006.01)
G02B 6/255 (2006.01)
G02B 6/44 (2006.01)

(52) U.S. Cl.
CPC .......... *G02B 6/2558* (2013.01); *G02B 6/443* (2013.01)

(58) Field of Classification Search
CPC .............................. G02B 6/2558; G02B 6/443
USPC .......................................................... 385/99
See application file for complete search history.

(56) References Cited

U.S. PATENT DOCUMENTS

| | | | |
|---|---|---|---|
| 5,528,718 A | 6/1996 | Ray et al. | |
| 5,825,963 A | 10/1998 | Burgett | |
| 6,152,609 A | 11/2000 | Dzyck et al. | |
| 6,792,191 B1* | 9/2004 | Clapp, Jr. | G02B 6/4452 385/135 |
| 7,756,372 B2 | 7/2010 | Mullaney et al. | |
| 2006/0269209 A1 | 11/2006 | Mullaney et al. | |
| 2015/0063770 A1* | 3/2015 | Kowalczyk | G02B 6/4457 385/135 |
| 2016/0139355 A1* | 5/2016 | Petersen | G02B 6/4478 385/100 |
| 2018/0024294 A1* | 1/2018 | Wang | G02B 6/2558 385/78 |
| 2021/0116642 A1* | 4/2021 | Wurst | G02B 6/3801 |
| 2021/0173146 A1* | 6/2021 | Wang | G02B 6/2557 |

OTHER PUBLICATIONS

International Search Report and Written Opinion for PCT/US2020/041209 dated Oct. 22, 2020, 12 pages.

* cited by examiner

*Primary Examiner* — Jerry M Blevins
(74) *Attorney, Agent, or Firm* — Merchant & Gould P.C.

(57) ABSTRACT

A multi-fiber cable assembly includes a pigtail segments spliced to a trunk segment using multiple mass fusion splices. The splices are disposed at axially spaced positions within a hollow, flexible conduit. Fibers of the trunk segment are axially fixed at a first demarcation region disposed at the first end of the conduit. Fibers of the pigtail segments are axially fixed at a separate, second demarcation region disposed at the second end of the conduit.

21 Claims, 7 Drawing Sheets

TERMINATING A CABLE ASSEMBLY WITH CONNECTORIZED PIGTAILS

CROSS REFERENCE TO RELATED APPLICATION

This application claims the benefit of U.S. Provisional Application No. 63/002,402, filed Mar. 31, 2020, and titled "Terminating a Cable Assembly with Connectorized Pigtails," the disclosure of which is hereby incorporated herein by reference in its entirety.

BACKGROUND

In fiber optic networks, there is a push to increase density by using higher fiber count cables in data centers and elsewhere. Cables having hundreds or even thousands of optical fibers each are being routed to equipment racks for connection. Ends of these cables are terminated at multiple multi-fiber connectors (e.g., MPO plug connectors). During termination, a cable jacket is removed to expose the optical fibers. Each optical fiber or small groups of fibers (e.g., fiber ribbons) may be manually threaded through furcation tubes. Then, the ends of the threaded fibers are connectorized, polished, and tested. Such a process is tedious, time-consuming, and labor intensive. Improvements are desired.

SUMMARY

Certain aspects of the disclosure are directed to cable assemblies in which one or more pigtail segments are spliced to a fiber optic cable (e.g., to a trunk segment of a fiber optic cable) using multiple mass fusion splices. The mass fusion splices are protected by an enclosure arrangement that allows coiling of the cable assembly. For example, groups of the mass fusion splices can all be disposed at spaced axial position along the enclosure arrangement. Segments of pigtail fibers and trunk cable fibers are fixed relative to the enclosure arrangement.

The enclosure arrangement includes a flexible conduit (e.g., a corrugated tube) in which the mass fusion splices are disposed. A first encapsulation is disposed at a first end of the conduit and a second encapsulation is disposed at a second end of the conduit. The first encapsulation holds a portion of the trunk cable fibers fixed relative to the conduit. The second encapsulation holds a portion of the pigtail fibers fixed relative to the conduit. In certain implementations, a protective sheath surrounds the pigtail segments and is embedded within the second encapsulation.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
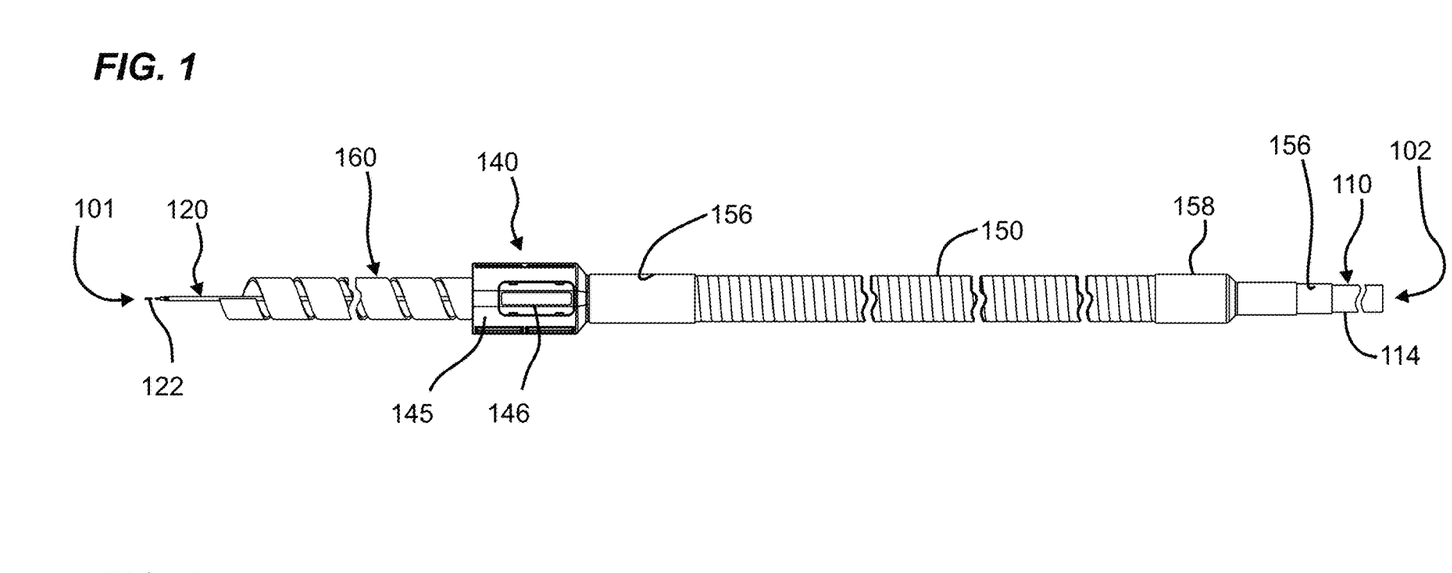
FIG. 1 is a side elevational view of a first example cable assembly including multiple mass fusion splices disposed within an encapsulation.
Figure 2:
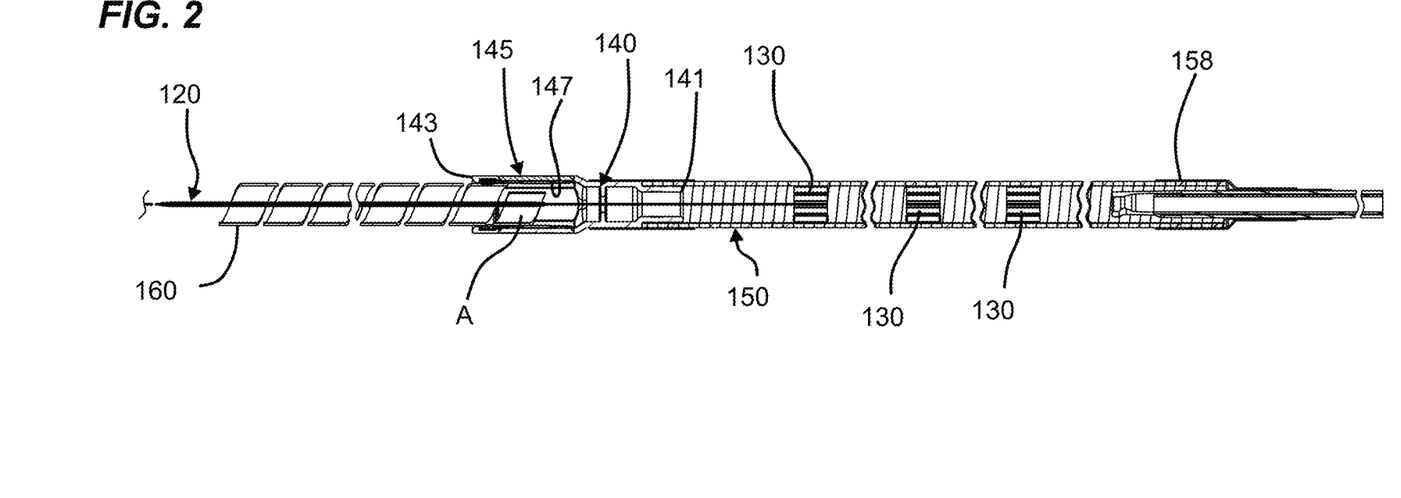
FIG. 2 is a longitudinal cross-sectional view of the first cable assembly of FIG. 1.

Referring to FIGS. 1 and 2, a multi-fiber cable assembly 100 extends axially along a longitudinal axis L between a first end 101 and a second end 102. The cable assembly 100 includes a trunk segment 110 and a plurality of pigtail segments 120. Only one of the pigtail segments 120 is illustrated for clarity. The trunk segment 110 includes a plurality of optical fibers 112 (e.g., loose fiber, ribbonized fiber, loose ribbon fiber, etc.) surrounded by a jacket 114. Each pigtail segment 120 includes a plurality of optical fibers 122 terminated at a common multi-fiber plug connector. The optical fibers 122 of each pigtail segment 120 are spliced to corresponding ones of the optical fibers 112 of the trunk segment 110 at respective mass fusion splices 130.

In some implementations, the splice locations between the pigtail segments 120 and the trunk segment 110 are laminated to protect the mass fusion splice. Examples of laminated mass fusion splices are described in more detail in U.S. Provisional Appl. No. 62/836,294, filed Apr. 19, 2019, and titled "Flexible Splice," the disclosure of which is hereby incorporated herein by reference in its entirety. In other implementations, the mass fusion splices are otherwise individually protected.

An enclosure arrangement 132 surrounds and protects the mass fusion splices 130. The enclosure arrangement 132 includes a hollow conduit 150, a first encapsulation 170, and a second encapsulation 140. The hollow conduit 150 extends along a length between opposite first and second ends 151, 153. The conduit 150 defines an axial passage 155 extending between the first and second ends 151, 153.

The conduit 150 is sized to hold all of the optical fibers 112 of the trunk segment 110. The conduit 150 includes a corrugated tube. In certain implementations, the conduit 150 defines an axial slit extending between the first and second ends 151, 153 to facilitate laterally mounting the conduit 150 over the trunk segment fibers 112. In certain implementations, the conduit 150 is sufficiently flexible to allow coiling of the enclosure arrangement 132 around a cable spool.

The cable assembly 100 is coilable about a spool or mandrel. In certain implementations, the enclosure arrangement 132 has a transverse cross-dimension that defines the maximum transverse cross-dimension of the cable assembly 100. In some implementations, the enclosure arrangement 132 has a maximum transverse cross-dimension of no more than 4 inches. In certain implementations, the enclosure arrangement 132 has a maximum transverse cross-dimension of no more than 3 inches. In certain implementations, the enclosure arrangement 132 has a maximum transverse cross-dimension of no more than 2 inches.

The cable assembly 100 includes at least twenty-four trunk segment fibers 112. In certain implementations, the cable assembly 100 includes at least seventy-two trunk segment fibers 112. In certain implementations, the cable assembly 100 includes at least one hundred forty-four trunk segment fibers 112. In certain implementations, the cable assembly 100 includes at least two hundred eighty-eight trunk segment fibers 112. In certain implementations, the cable assembly 100 includes at least 576 trunk segment fibers 112. In certain implementations, the cable assembly 100 includes at least 864 trunk segment fibers 112. In certain implementations, the cable assembly 100 includes at least 1728 trunk segment fibers 112. In certain implementations, the cable assembly 100 includes at least 3456 trunk segment fibers 112.

For ease in viewing, only a single pigtail segment 120 is shown in the drawings. It will be understood, however, that the cable assembly 100 includes at least two pigtail segments 120. In certain implementations, the cable assembly 100 includes at least twelve pigtail segments 120. In certain implementations, the cable assembly 100 includes at least twenty-four pigtail segments 120. In certain implementations, the cable assembly 100 includes at least forty-eight pigtail segments 120. In certain implementations, the cable assembly 100 includes at least seventy-two pigtail segments 120. In certain implementations, the cable assembly 100 includes at least 144 pigtail segments 120. In certain implementations, the cable assembly 100 includes at least 288 pigtail segments 120.

Referring to FIG. 2, in certain implementations, the mass fusion splices 130 are disposed at axially spaced positions within the axial passage of the conduit 150. In some implementations, the mass fusion splices 130 are individually spaced along the axial passage 155. In other implementations, the mass fusion splices 130 are separated into groups with each group being disposed at one of the axially spaced positions. The enclosure arrangement 132 is designed to be assembled around the splices 130 as will be described in more detail herein.

The first encapsulation 170 is disposed at the first end 151 of the conduit 150 and the second encapsulation 140 is disposed at the second end 153 of the conduit 150. In certain implementations, the second encapsulation 140 is spaced from the first encapsulation 170 by at least a majority of the length of the flexible conduit 150. The first encapsulation 170 surrounds a first section of the trunk cable fibers 112 and holds the first section fixed relative to the conduit 150. The second encapsulation 140 surrounds a second section of the pigtail cable fibers 122 and holds the second section fixed relative to the conduit 150. Accordingly, the first and second encapsulations 170, 140 inhibit pistoning of the trunk cable fibers 112 and pigtail fibers 122 within the conduit 150, which inhibits axial loads from being applied to the mass fusion splices 130. FIGS. 4-9 illustrate a first example implementation of the first encapsulation 170. The first encapsulation 170 includes a first body 172 defining a through-passage 174 extending between opposite open ends 176, 178 of the first body 172. The first encapsulation 170 also includes adhesive A disposed within the through-passage 174 to axially and rotationally fix the trunk cable fibers 112, which extend through the through-passage 174 (e.g., see FIG. 9).

Figure 5:
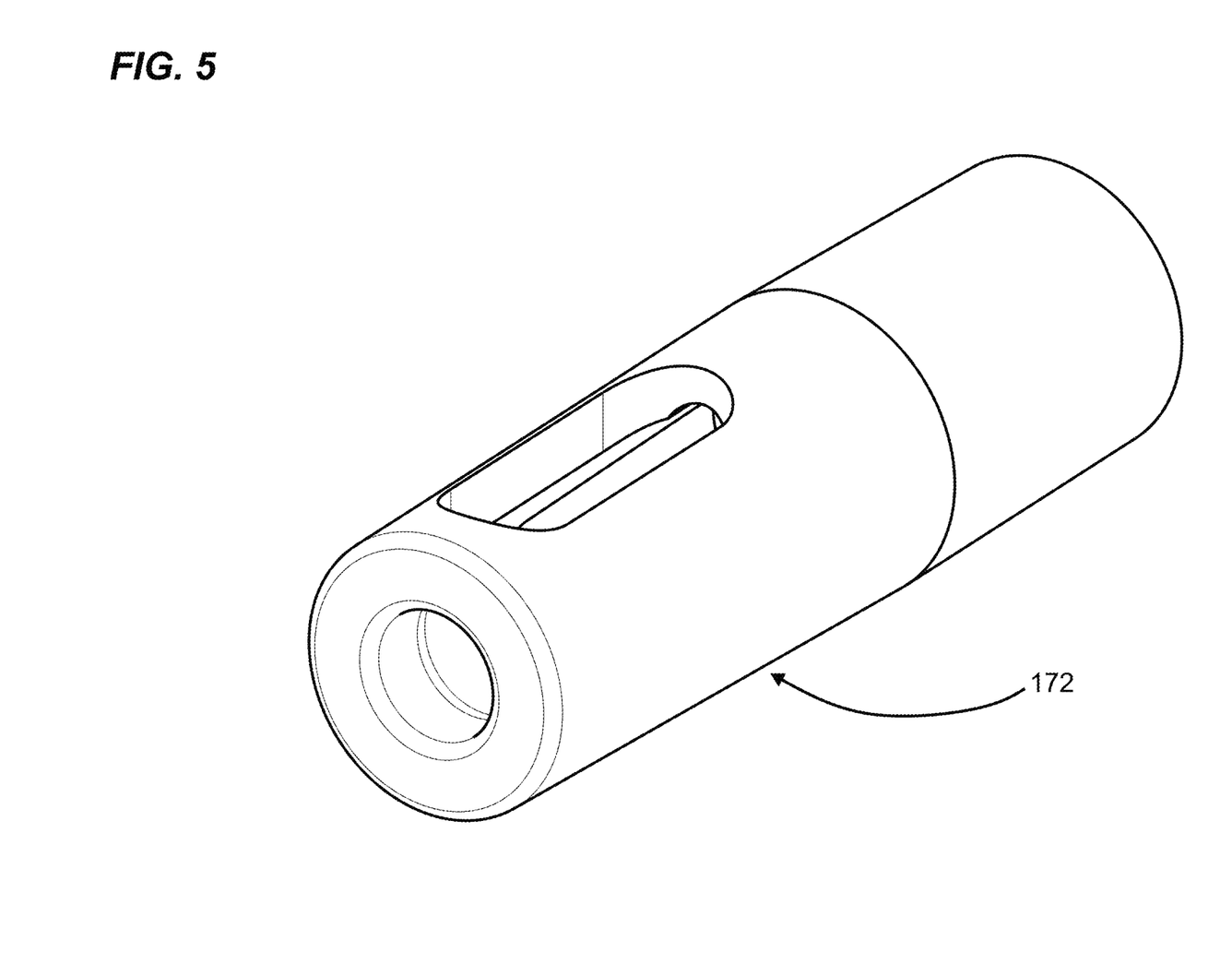
FIG. 5 is a perspective view of an example first body suitable for use with the first encapsulation of FIG. 4.
Figure 6:
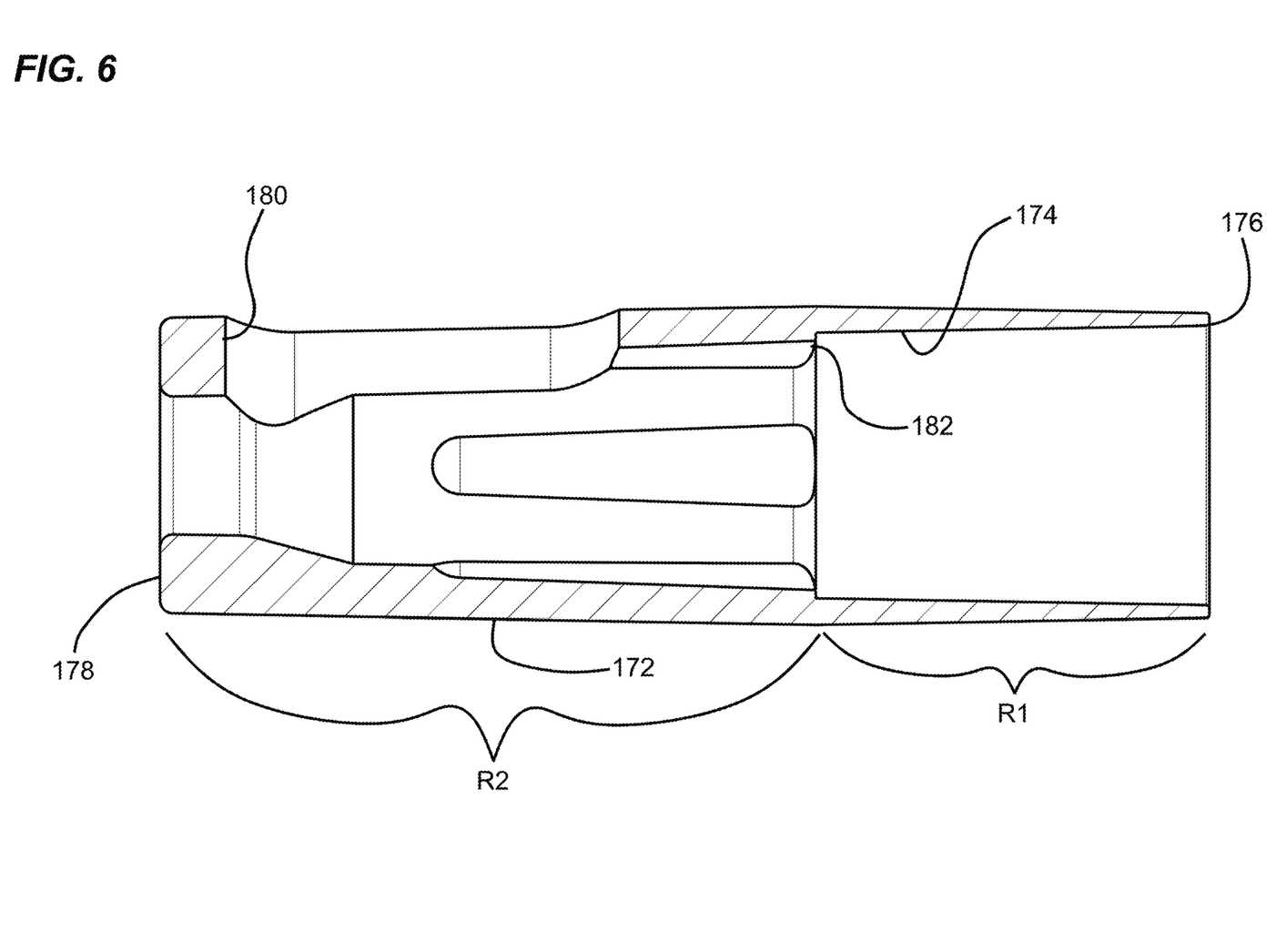
FIG. 6 is an axial cross-section of the first body of FIG. 5.
Figure 7:
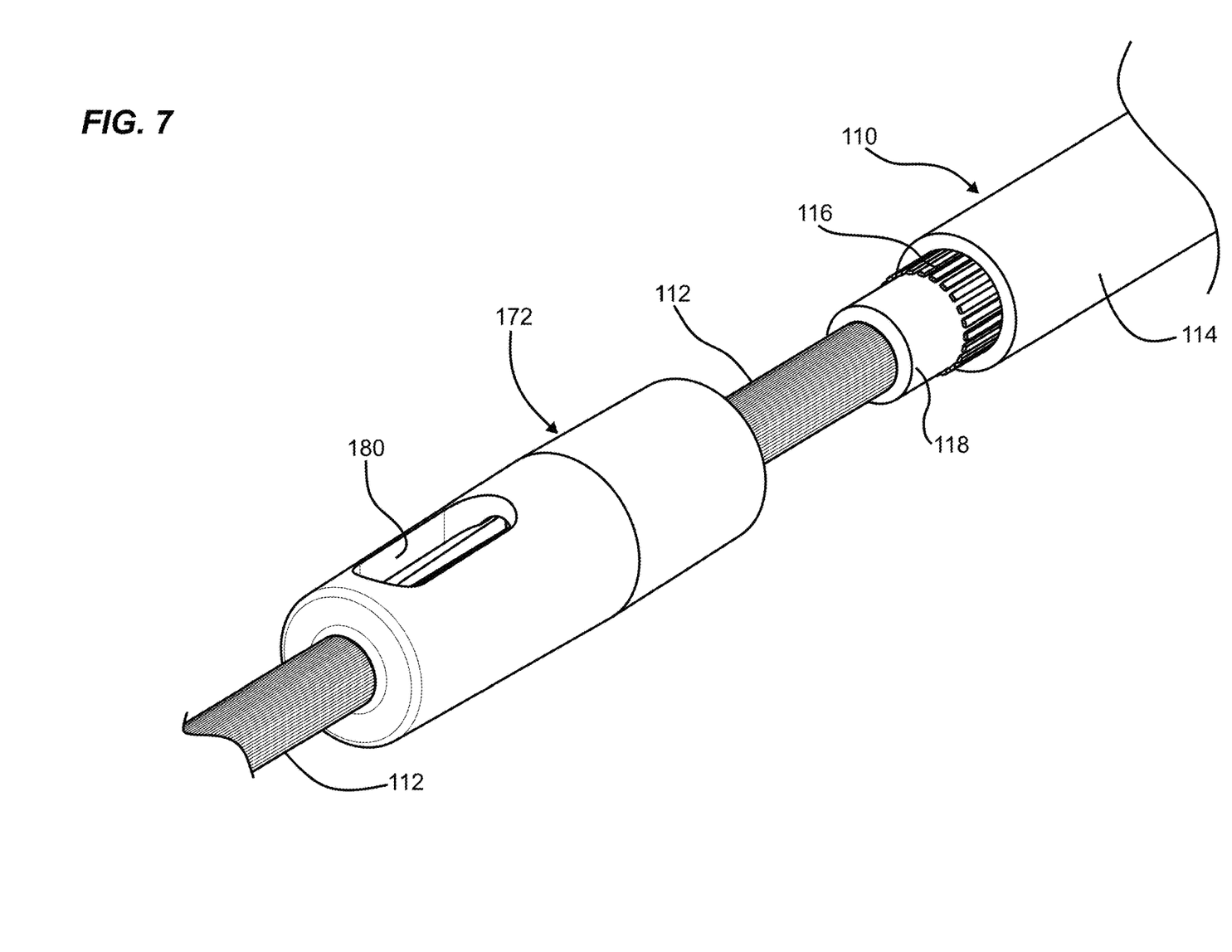
FIG. 7 is a perspective view of the first body shown exploded away from a terminated end of the jacket of the trunk segment so that the strength members and optional inner tube of the trunk segment are visible.
Figure 8:
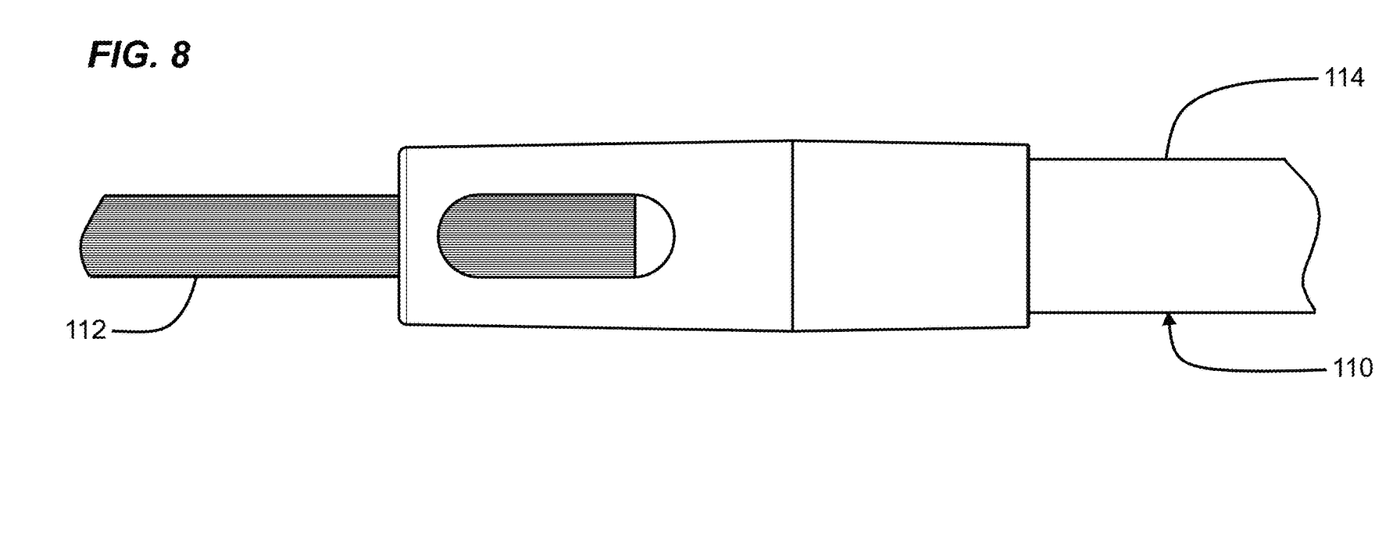
FIG. 8 is a top plan view of the first encapsulation of FIG. 4.
Figure 9:
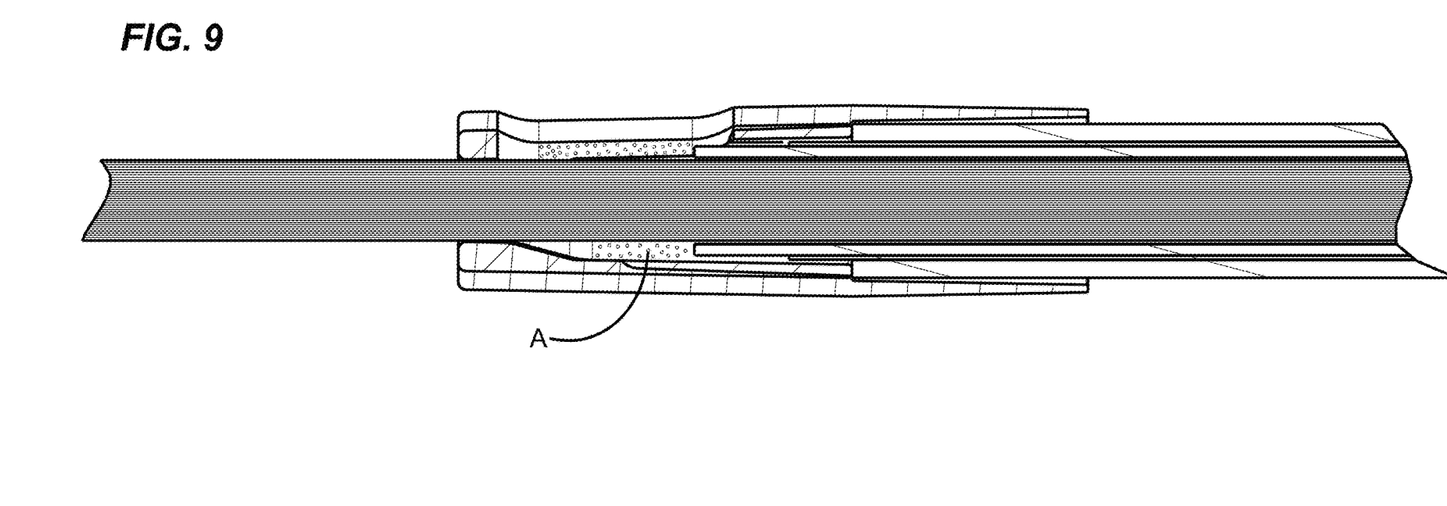
FIG. 9 is an axial cross-section of the first encapsulation of FIG. 8.

The first body 172 defines an aperture 180 leading to the through passage 174 from an exterior of the first body 172 at a location between the first and second open ends 176, 178 of the first body 172. The aperture 180 allows adhesive (e.g., epoxy) A to be inserted into the through-passage 174 from an exterior of the first body 172. For example, the adhesive A may be injected into the through-passage 174 while the trunk cable fibers 112 extend through the through-passage 174. Accordingly, the second end 178 of the first body 172 can be sized to fit tightly around the trunk cable fibers 112 to inhibit leaking of the adhesive A out of the first body 172.

The through-passage 174 of the first body 172 has a first region R1 at the first end 176 of the first body 172 and a second region R2 at the second end 178 of the first body 172. In certain implementations, the second region R2 is narrower than the first region R1. In certain implementations, a radial step 182 separates the first and second regions R1, R2. In certain implementations, the second region R2 constricts as the through-passage 174 extends towards the second open end 178 of the first body 172.

The trunk cable fibers 112 extend fully through the first and second regions R1, R2 of the first body 172. The jacket 114 of the trunk segment 110 extends into the first region R1 of the first body 172 from the first open end 176, but terminates before reaching the second region R2. For example, the terminated end of the jacket 114 may abut the radial step 182 (e.g., see FIG. 9). In certain implementations, the aperture 180 is defined at the second region R2 so that adhesive A may be applied directly to the trunk cable fibers 112. In certain examples, the aperture 180 is an elongate slot to facilitate distribution of the adhesive within the second region R2. In certain implementations, the adhesive A closes the aperture 180 when the adhesive A solidifies.

In certain implementations, the trunk segment 110 also includes strength members 116 extending through at least the first region R1 of the through-passage 174. In certain examples, the strength members 116 extend at least partially through the adhesive A in the second region R2. Accordingly, axial loads are transferred from the strength members 116, through the first encapsulation 170, to the conduit 150. In certain examples, the trunk segment 110 also includes a buffer tube 118 radially between the fibers 112 and the strength members 116. In some examples, the buffer tube 118 extends only through the first region R1. In other examples, the buffer tube 118 may extend at least partially into the adhesive A in the second region R2.

In certain implementations, the first body 172 is disposed within the conduit 150 at the first end 151 (e.g., see FIG. 2). For example, the conduit 150 can be threaded over the trunk segment 110 before the pigtail segments are spliced. After splicing, the conduit 150 can be slid over the mass fusion splices 130 so that the first body 172 is disposed at the first end 151 of the conduit 150.

In certain implementations, the conduit 150 may be secured to the first body 172 using a retention sleeve arrangement. In certain examples, a first retention sleeve 156 extends over the first region R1 of the first body 172 and over a portion of the jacket 114 of the trunk segment 110. A second retention sleeve 158 extends over the first end 151 of the conduit 150 and over the first retention sleeve 156. Accordingly, the retention sleeve arrangement holes the first body 172 axially fixed relative to the conduit 150. In certain examples, the retention sleeves 156, 158 shrinks against the first body 172, the trunk cable jacket 114, and/or the first end 151 of the conduit 150 (e.g., the sleeve 156, 158 is thermally responsive, the sleeve 156, 158 is resilient, etc.). In certain examples, one or both of the first and second retention sleeves 156, 158 carries adhesive at an inner surface to bond the retention sleeves 156, 158 to the conduit 150, the first body 172, and/or the trunk cable jacket 114.

Figure 3:
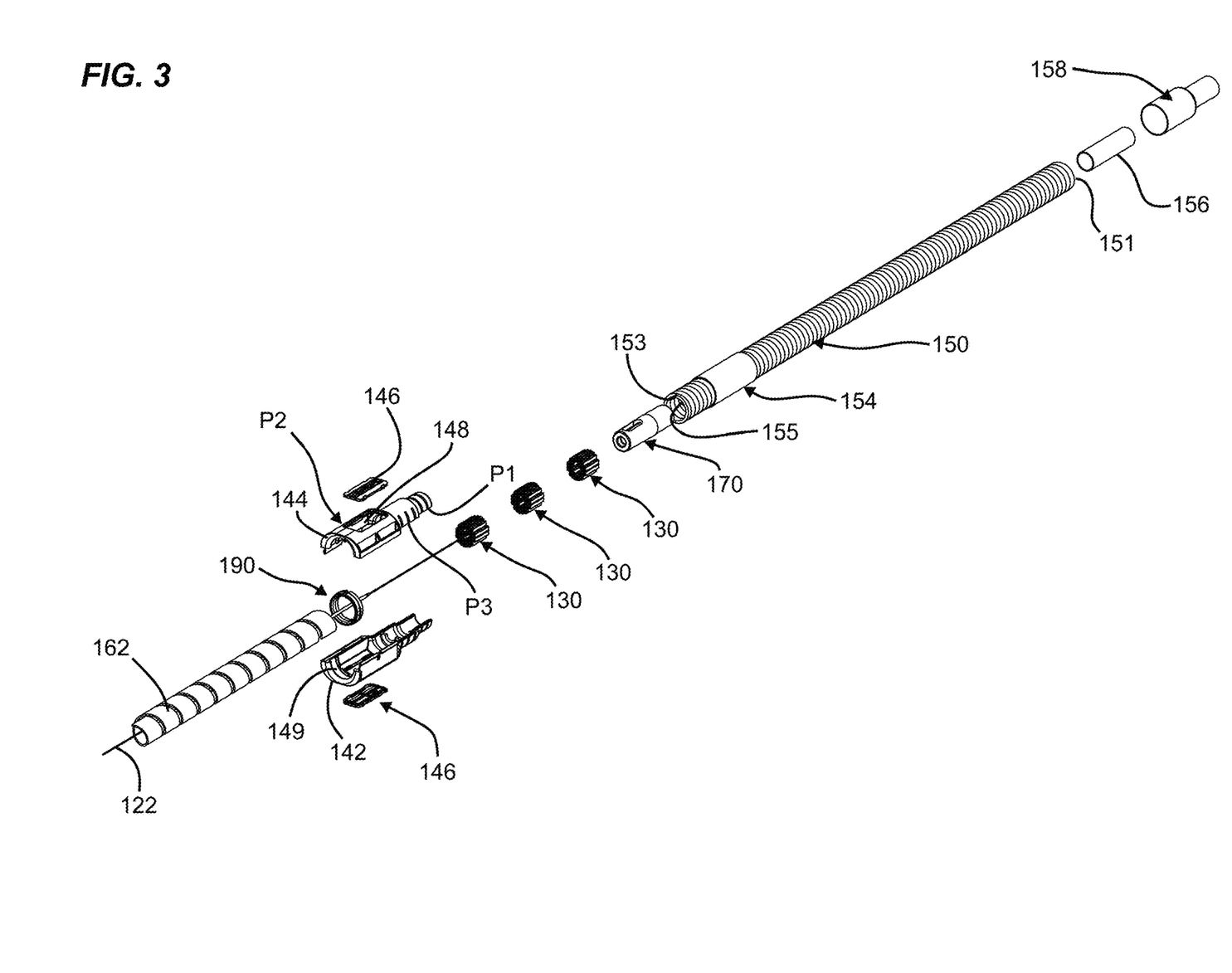
FIG. 3 is a perspective view of the first cable assembly of FIG. 1 with the components exploded from each other for ease in viewing.
Figure 4:
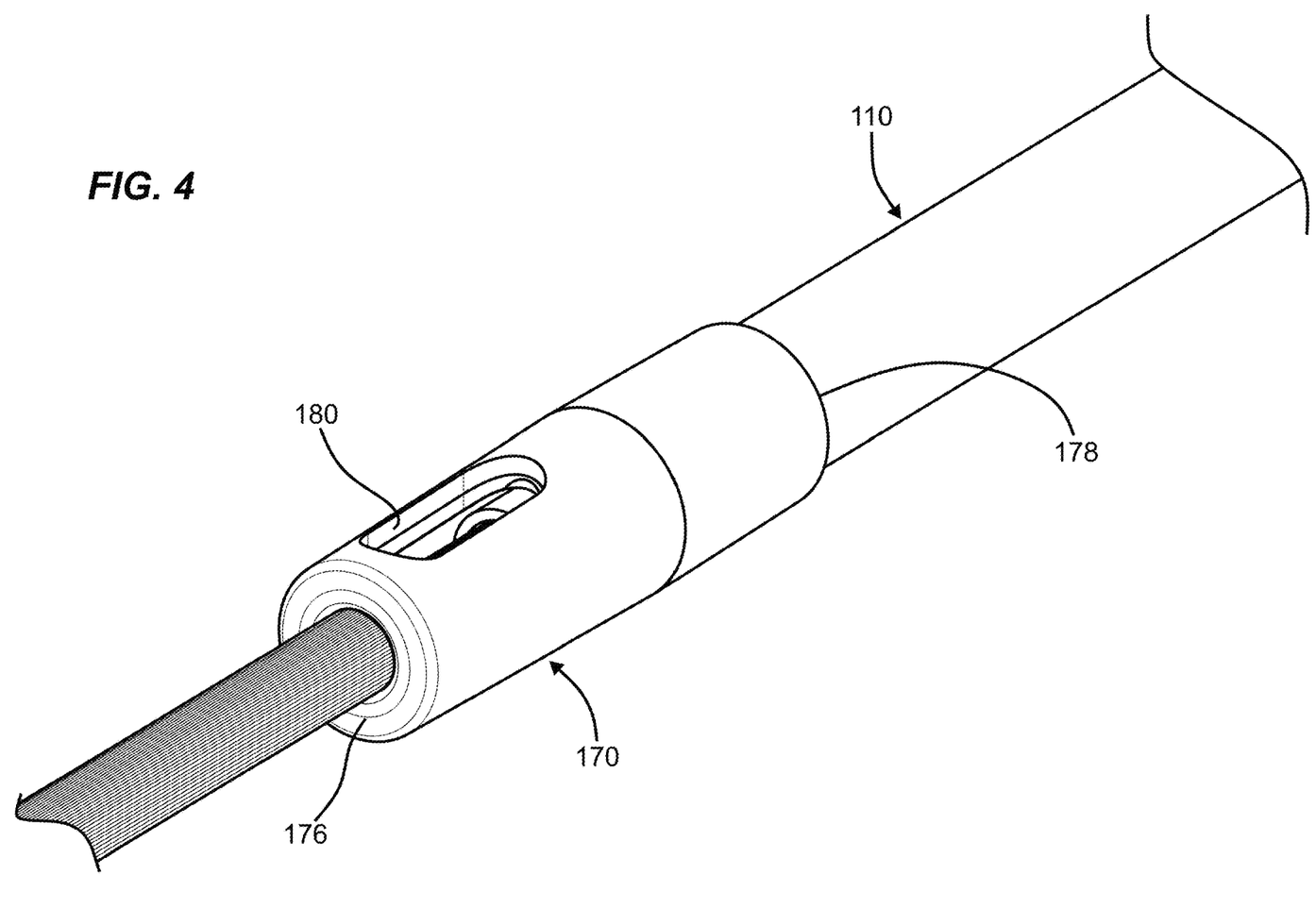
FIG. 4 is a perspective view of an example first encapsulation of the first cable assembly of FIG. 1.

In certain implementations, the second encapsulation 140 includes a second body 145 extending between open first and second ends 141, 143. The second body 145 defines a cavity 147 through which the pigtail segments 120 extend. In certain examples, the cavity 147 is filled with adhesive A. Accordingly, the portion of the pigtail segments 120 extending through the cavity 147 is axially and rotationally fixed to the second body 145. Connecting the second body 145 to the second end 153 of the conduit 150 inhibits pistoning of the pigtail fibers 122 within the conduit 150, which inhibits axial loads from being applied to the mass fusion splices 130.

A protective sheath 160 extends from the second end 143 of the second body 145 towards the multi-fiber connectors of the pigtail segments 120. The sheath 160 is sized to hold all of the optical fibers 122 of the pigtail segments 120. The sheath 160 is sufficiently flexible to allow the cable assembly 100 to be wound on a cable spool. In some implementations, the sheath 160 provides bend radius protection to the optical fibers 122. In other implementations, the sheath 160 holds the fibers 122 together in a group for manipulation as a unit. In some implementations, the sheath 160 includes a spiral wrap sheath that can be wrapped around the pigtail segments 120 after the pigtail segments 120 are spliced to the trunk segment 110. In other implementations, the sheath 160 can includes a mesh sleeve.

The second body 145 includes at least a first housing piece 142 and a second housing piece 144 that cooperate to define the cavity 147. Because the second body 145 is formed from at least two pieces, the second body 145 can be easily assembled around the mass fusion splices 130. The pieces 142, 144 include an attachment arrangement to hold the pieces 142, 144 together. In certain examples, at least one of the pieces 142, 144 includes latches and at least the other of the pieces 142, 144 includes catches configured to receive the latches. In the example shown, both pieces 142, 144 include both latches and catches.

The sheath 160 is axially fixed to the second encapsulation 140. In certain implementations, the sheath 160 is embedded within the second encapsulation 140. For example, the second body 140 can be assembled around the sheath 160 after the sheath 160 is mounted about the pigtail segments 120. Adhesive can then be injected into the cavity 147 of the second body 145 around the pigtail segments 120 and sheath 160. In certain implementations, a ring clip 180 or other plug is disposed within the second body 145 to inhibit the adhesive from exiting the second body 145. For example, the ring clip 180 may seat within a pocket 149 defined within the second body 145 (see FIG. 3).

In certain implementations, at least one of the first and second pieces 142, 144 defines an injection opening 148 through which the adhesive A can be inserted into the cavity 147. In certain examples, each of the first and second pieces 142, 144 defines a respective injection opening 148. In certain implementations, the first and second housing pieces 142, 144 are identical.

In certain implementations, the second body 145 also includes a respective third piece 146 that closes each injection opening 148. In certain implementations, the third piece 146 latches or otherwise secures to the respective piece 142, 144. In certain implementations, the third piece 146 is installed before or while the adhesive is curing. In such implementations, the adhesive can hold the third piece 146 to the respective housing piece 142, 144. In certain implementations, the third piece 146 is sized so that a periphery of the third piece 146 fits within the aperture 148 of the respective housing piece 142, 144. Accordingly, the third housing piece 146 may fit within a profile defined by the first and second housing pieces 142, 144.

In certain implementations, an attachment structure couples the third housing piece 146 to the respective housing piece 142, 144. In certain examples, the attachment structure includes latches and catches. In the example shown, the latches are provided by the third housing piece 146 and the catches are provided by the first and/or second housing piece 142, 144. In other examples, however, each housing piece 142, 144, 146 can include latches and catches. In the example shown, the latches are recessed inwardly from the periphery to permit the third piece 146 to extend across the aperture 148 of the respective housing piece 142, 144.

As shown in FIG. 3, a ring clip 190 includes a body defining a through-passage. The body also defines an axial slit providing radial access to the through-passage from an exterior of the ring clip body. The ring clip body is sufficiently resilient to enable flexing of the ring clip body to open or widen the slit. Accordingly, the pigtail segments 120 can be laterally loaded into the ring clip 190 via the slit. Laterally loading the pigtail segments 120 allows the ring clip 190 to hold more pigtail segments 120 than it otherwise would had the connectorized ends of the pigtail segments needed to be threaded through the through-passage of the ring clip 190.

Pigtail segments 120 are loaded into the ring clip 190 and the ring clip 190 is disposed in the pocket 149 within the housing cavity 147. The pocket 149 axially retains the ring clip 190 relative to the second body 145. The ring clip 190 is sized to fit around the spiral wrap sheath 160 (see FIG. 2). In certain implementations, the ring clip 190 plugs the second end of the second body 145 to inhibit adhesive from leaking or otherwise exiting the cavity 147 through the second end. For ease in viewing, only one pigtail segment 120 is shown extending through the sheath 160. In use, a plurality of pigtail segments 120 would extend through the sheath 160 sufficient to block flow of the epoxy out of the second body 145 through the sheath 160.

In some implementations, the second encapsulation 140 is disposed external of the conduit 150. In other implementations, a portion of the second encapsulation 140 is disposed within the conduit 150 and another portion of the second encapsulation 140 is disposed external of the conduit 150. A retention sleeve 154 holds the second encapsulation axially fixed relative to the conduit 150. For example, the retention sleeve 154 extends around the second end 153 of the conduit 150 and part of the second body 145.

In certain implementations, the second body 145 has a first portion P1 that extends into the conduit 150, a second portion P2 disposed that defines the cavity 147, and a third portion P3 disposed axially between the first and second portions P1, P2. The second and third portions P2, P3 are disposed external of the conduit 150 of the cable assembly 100. The retention sleeve 154 extends from the conduit 150 over the third portion P3 of the second body 145. In certain implementations, ribs at the first portion P1 may aid in holding the conduit 150 to the second body 145.

In certain implementations, the first and third portions P1, P3 have a smaller transverse cross-section than the second portion P2. In certain examples, the first portion P1 has a smaller transverse cross-section that the third portion P3. In certain implementations, the third portion P3 of the second body 145 defines ribs or other texturing to aid in holding the retention sleeve 154 at the third portion P3.

The retention sleeve 154 is threaded onto the trunk segment 110 before splicing the pigtail segments 120 to the trunk segment 110. After splicing, the conduit 150 can be slid over the mass fusion splices 130 so that the second end 153 of the conduit slides over part of the second body 145. In certain examples, the retention sleeve 154 shrinks against the second body 145 and/or the second end 153 of the conduit 150 (e.g., the sleeve 154 is thermally responsive, the sleeve 154 is resilient, etc.). In certain examples, the retention sleeve 154 carries adhesive at an inner surface to bond to the second body 145 and/or to the conduit 150.

In use, the cable assembly 100 is manufactured quickly and easily by pre-preparing the pigtail segments 120 and then splicing the pre-prepared pigtail segments 120 to the trunk segment 110. Because the pigtail segments 120 are pre-prepared, the labor and/or resource intensive steps of polishing and testing the connectorization of the pigtail segments can be done ahead of time (e.g., at a dedicated location). Accordingly, the technician(s) manufacturing the cable assembly 100 need not spend time testing the connectorization of the individual fibers. Further, the technician need not spend time threading trunk segment fibers 112 through furcation tubes or otherwise upjacketing the trunk segment fibers 112.

Rather, the cable assembly 100 is manufactured by stripping an end of the trunk segment 110 to expose bare fibers 112 that are sufficiently long to reach a splice machine (e.g., a mass fusion splicer). The retention sleeves 154, 156, 158 are threaded onto the trunk segment 110 prior to splicing. In certain examples, the conduit 150 also is threaded onto the trunk segment 110 prior to splicing.

The pigtail segments 120 are prepared (e.g., pre-prepared at a different location) to have bare fiber segments 122 of sufficient length to splice to the bare fibers 112 of the trunk segment 110. In certain implementations, the trunk fibers 112 and pigtail fibers 122 are sufficiently long to enable re-splicing of the optical fibers 112, 122 if needed. In certain implementations, the trunk fibers 112 and pigtail fibers 122 are sufficiently long to enable re-splicing of the optical fibers 112, 122 multiple times.

In certain implementations, the connectorized ends of the pigtail segments 120 are plugged into testing equipment during the splicing step. Accordingly, a technician can immediately determine whether the splice was successful. If the splice was not successful, then the technician can attempt to re-splice the fibers 112, 122 as needed while still at the splicing machine.

Once the pigtail segments 120 are spliced to the trunk segment 110, the first encapsulation 170 is installed around the trunk cable fibers 112 and the second encapsulation 140 is installed around the pigtail fibers 122. Subsequent to encapsulation, the conduit 150 is slid over the encapsulations 170, 140 and the splices 130. The conduit 150 is axially fixed to the encapsulations 170, 140 using the retention sleeves 156, 158, 154.

In certain implementations, the splices 130 are disposed within the conduit so that each splice is axially offset from a majority of the splices 130. In some examples, the splices are arranged in groups with each group being axially offset from the other groups. In other examples, each splice is at least partially offset from all of the other splices. Axially offsetting the splices reduces the necessary transverse cross-dimension of the conduit 150 since the conduit 150 need not accommodate all of the splices 130 at a common axial position.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A multi-fiber cable assembly comprising:
   a conduit extending along a length between opposite first and second ends, the conduit defining an axial passage extending between the first and second ends;
   a trunk segment including a plurality of trunk cable fibers surrounded by a jacket;
   a plurality of pigtail segments, each pigtail segment including a plurality of pigtail fibers extending from first ends to second ends, the first ends of each pigtail segment being terminated at a respective multi-fiber connector, the second ends of each pigtail segment being spliced at a respective mass fusion splice to first ends of at least some of the trunk cable fibers, the mass fusion splices being disposed at axially spaced positions within the axial passage of the conduit;
   a first encapsulation disposed at the first end of the conduit, the first encapsulation surrounding a first section of the trunk cable fibers and holding the first section fixed relative to the first end of the conduit;
   a second encapsulation disposed at the second end of the conduit so that the second encapsulation is spaced from the first encapsulation by at least a majority of the length of the flexible conduit, the second encapsulation surrounding a second section of the pigtail cable fibers and holding the second section fixed relative to the second end of the conduit; and
   wherein the first encapsulation includes a first body defining a through-passage extending between opposite open ends of the first body, the first encapsulation also including adhesive disposed within the through-passage to axially and rotationally fix the trunk cable fibers, which extend through the through-passage.

2. The multi-fiber cable assembly of claim 1, wherein the mass fusion splices being disposed at axially spaced positions within the axial passage of the conduit includes the mass fusion splices being separated into groups with each group being disposed at one of the axially spaced positions.

3. The multi-fiber cable assembly of claim 2, wherein the first body defines an aperture leading to the through passage from an exterior of the first body at a location between the first and second open ends of the first body.

4. The multi-fiber cable assembly of claim 3, wherein the through-passage of the first body has a first region at the first end of the first body and a second region at the second end of the first body, wherein the jacket of the trunk segment extends into the first region from the first open end and terminate before reaching the second region, wherein the trunk cable fibers extend fully through the first and second regions of the first body, and wherein the aperture is defined at the second region.

5. The multi-fiber cable assembly of claim 3, wherein the through passage constricts as the through passage extends from the first open end to the second open end.

6. The multi-fiber cable assembly of claim 3, wherein the aperture is an elongate slot.

7. The multi-fiber cable assembly of claim 2, wherein the trunk segment also includes strength members extending into the through-passage and at least partially through the adhesive.

8. The multi-fiber cable assembly of claim 1, wherein the conduit includes a corrugated tube.

9. The multi-fiber cable assembly of claim 1, further comprising:
a first heat-shrink tube that extends over a portion of the first encapsulation and a portion of the jacket of the trunk segment;
a second heat-shrink tube that extends over the first end of the conduit and a portion of the first heat-shrink tube; and
a third heat shrink tube that extends over a portion of the second encapsulation and the second end of the conduit.

10. The multi-fiber cable assembly of claim 1, wherein the maximum transverse cross-sectional dimension is no more than 2 inches.

11. The multi-fiber cable assembly of claim 1, wherein the cable assembly is coilable on a spool.

12. The multi-fiber cable assembly of claim 1, wherein the plurality of pigtail segments includes at least 144 pigtail segments.

13. A conduit extending along a length between opposite first and second ends, the conduit defining an axial passage extending between the first and second ends;
a trunk segment including a plurality of trunk cable fibers surrounded by a jacket;
a plurality of pigtail segments, each pigtail segment including a plurality of pigtail fibers extending from first ends to second ends, the first ends of each pigtail segment being terminated at a respective multi-fiber connector, the second ends of each pigtail segment being spliced at a respective mass fusion splice to first ends of at least some of the trunk cable fibers, the mass fusion splices being disposed at axially spaced positions within the axial passage of the conduit;
a first encapsulation disposed at the first end of the conduit, the first encapsulation surrounding a first section of the trunk cable fibers and holding the first section fixed relative to the first end of the conduit;
a second encapsulation disposed at the second end of the conduit so that the second encapsulation is spaced from the first encapsulation by at least a majority of the length of the flexible conduit, the second encapsulation surrounding a second section of the pigtail cable fibers and holding the second section fixed relative to the second end of the conduit; and
further comprising a protective sheathing disposed around at least a portion of the pigtail segments, the protective sheathing extending between a first end and a second end, the first end of the protective sheathing being embedded in the second encapsulation.

14. The multi-fiber cable assembly of claim 13, wherein the second encapsulation includes a second body defining a cavity through which the pigtail segments extend, the cavity being filled with adhesive.

15. The multi-fiber cable assembly of claim 14, further comprising a ring clip disposed within the second body to inhibit adhesive from leaking from the cavity through one end of the second body, the ring clip contacting the protective sheathing, the ring clip defining an axial slit to enable the pigtail segments to be laterally inserted into the ring clip through the slit.

16. The multi-fiber cable assembly of claim 15, wherein the protective sheathing includes a spiral wrap sheath, and wherein the ring clip is disposed around the spiral wrap sheath.

17. The multi-fiber cable assembly of claim 14, wherein the second body includes at least a first piece and a second piece that cooperate to define the cavity to enable the pigtail segments and protective sheathing to be laterally inserted into the cavity.

18. The multi-fiber cable assembly of claim 17, wherein at least one of the first and second pieces defines an injection opening through which the adhesive can be inserted into the cavity, and wherein the second body also includes a third piece that closes the injection opening.

19. The multi-fiber cable assembly of claim 18, wherein each of the first and second pieces defines a respective injection opening.

20. A multi-fiber cable assembly comprising:
a conduit extending along a length between opposite first and second ends, the conduit defining an axial passage extending between the first and second ends;
a trunk segment including a plurality of trunk cable fibers surrounded by a jacket;
a plurality of pigtail segments, each pigtail segment including a plurality of pigtail fibers extending from first ends to second ends, the first ends of each pigtail segment being terminated at a respective multi-fiber connector, the second ends of each pigtail segment being spliced at a respective mass fusion splice to first ends of at least some of the trunk cable fibers, the mass fusion splices being disposed at axially spaced positions within the axial passage of the conduit;
a first encapsulation disposed at the first end of the conduit, the first encapsulation surrounding a first section of the trunk cable fibers and holding the first section fixed relative to the first end of the conduit;
a second encapsulation disposed at the second end of the conduit so that the second encapsulation is spaced from the first encapsulation by at least a majority of the length of the flexible conduit, the second encapsulation surrounding a second section of the pigtail cable fibers and holding the second section fixed relative to the second end of the conduit; and
wherein the first encapsulation includes a first body, and wherein the trunk cable fibers extend through the first body and are axially and rotationally fixed within and relative to the first body.

21. The multi-fiber cable assembly of claim 20, wherein the mass fusion splices being disposed at axially spaced positions within the axial passage of the conduit includes the mass fusion splices being separated into groups with each group being disposed at one of the axially spaced positions.

* * * * *

UNITED STATES PATENT AND TRADEMARK OFFICE
CERTIFICATE OF CORRECTION

PATENT NO.         : 11,906,782 B2
APPLICATION NO.    : 17/217470
DATED              : February 20, 2024
INVENTOR(S)        : Cyle D. Petersen Page 1 of 1

It is certified that error appears in the above-identified patent and that said Letters Patent is hereby corrected as shown below:

In the Claims

Column 8, Line 46, Claim 3: "of claim 2," should read --of claim 1,--

Column 8, Line 64, Claim 7: "of claim 2," should read --of claim 1,--

Signed and Sealed this
Second Day of July, 2024

Katherine Kelly Vidal
*Director of the United States Patent and Trademark Office*